(12) United States Patent
Mazeiller

(10) Patent No.: US 8,498,840 B2
(45) Date of Patent: Jul. 30, 2013

(54) METHOD OF DETERMINING THE THICKNESS OF A MAILPIECE

(75) Inventor: Dominique Mazeiller, La Frette sur Seine (FR)

(73) Assignee: Neopost Technologies, Bagneux (FR)

( * ) Notice: Subject to any disclaimer, the term of this patent is extended or adjusted under 35 U.S.C. 154(b) by 320 days.

(21) Appl. No.: 12/758,535

(22) Filed: Apr. 12, 2010

(65) Prior Publication Data

US 2010/0274526 A1 Oct. 28, 2010

(30) Foreign Application Priority Data

Apr. 24, 2009 (FR) ..................................... 09 52683

(51) Int. Cl.
*G01B 11/06* (2006.01)
*G01B 11/02* (2006.01)
*G01B 11/30* (2006.01)
*G06F 3/00* (2006.01)

(52) U.S. Cl.
USPC ............ 702/170; 702/155; 702/182; 702/183

(58) Field of Classification Search
USPC ................. 702/101, 170, 173, 175, 179, 182, 702/183, 186; 73/159; 83/13; 209/584; 271/176; 705/406
See application file for complete search history.

(56) References Cited

U.S. PATENT DOCUMENTS

| 5,535,127 | A * | 7/1996 | Uno et al. ...................... 705/406 |
| 6,505,534 | B2 * | 1/2003 | Robertson et al. ................. 83/13 |
| 6,749,194 | B2 * | 6/2004 | Hanson et al. ................. 271/176 |
| 7,315,007 | B2 * | 1/2008 | Redford et al. ............... 209/584 |
| 7,669,470 | B2 * | 3/2010 | Sanford .......................... 73/159 |
| 7,974,852 | B2 * | 7/2011 | Morales ......................... 705/1.1 |
| 2003/0104642 | A1 | 6/2003 | Ijichi et al. |
| 2007/0198440 | A1 | 8/2007 | Defosse |

FOREIGN PATENT DOCUMENTS

| FR | 2 762 239 A1 | 10/1998 |
| FR | 2 896 578 A1 | 7/2007 |

* cited by examiner

*Primary Examiner* — Michael Nghiem
*Assistant Examiner* — Felix Suarez
(74) *Attorney, Agent, or Firm* — Sughrue Mion, PLLC

(57) ABSTRACT

A method of measuring the maximum thickness of a mailpiece while it is moving through a mail-handling machine. The method includes: acquiring a thickness measurement; recording the measured value in a register; determining a maximum value and a minimum value of the register; determining a difference between said maximum value and minimum value, and comparing the difference with a predetermined threshold value; and if the difference is less than the threshold value, and if the maximum value is greater than a current maximum thickness value, taking the maximum value as the new current maximum thickness value for the mailpiece.

5 Claims, 2 Drawing Sheets

METHOD OF DETERMINING THE THICKNESS OF A MAILPIECE

TECHNICAL FIELD

The present invention relates exclusively to the field of mail handling and it relates more particularly to a method making it possible to determine accurately the thickness of a mailpiece while said mailpiece is moving through a mail-handling machine.

PRIOR ART

Mailpiece pricing is based on criteria of mailpiece weight and/or of mailpiece size (thickness, length, and/or width of the envelope). Mailpiece dimensions are therefore important parameters in postage meters or "franking machines" and in other mail-handling machines. Many postal services depend on mailpiece format, and it is then necessary to check, in particular, whether said format is greater than thresholds. Thickness measurement, in particular when it is associated with format measurement, makes it possible to obtain an estimate of the weight when said weight is not available directly.

Unfortunately, thickness measurement is difficult because mailpieces are often not of uniform thickness. In particular, Application FR 2 896 578 filed in the name of the Applicant discloses a measurement device that, as the mailpiece is advancing, takes a set of successive measurements and then computes the mean thereof so as to overcome the problem of such variations in thickness. However, that value does not reflect the real thickness of the mailpiece, and it can therefore give rise to errors in the determination of the postage amount. Therefore, rather than taking account of the mean value, the Applicant considered taking account of the maximum value of the thickness, which corresponds more closely to the real thickness of the mailpiece. Unfortunately, in practice, the results are no better because the measured maximum value does not correspond to the real value any better due to the successive jolts and rebounds due to the measuring device coming into contact with the mailpieces.

OBJECT AND DEFINITION OF THE INVENTION

An object of the present invention is to mitigate the above-mentioned drawbacks with a method of determining the thickness of a mailpiece that is unaffected by the measurement defects that occur in a mail-handling machine. Another object of the invention is to propose a method of measurement that is simple to implement and that does not require any redefinition of the overall architecture of the franking machine.

These objects are achieved by a method of measuring the maximum thickness of a mailpiece while it is moving through a mail-handling machine, the method consisting in the following successive steps:

acquiring a thickness measurement;
recording the measured value in a register;
determining a maximum value and a minimum value of said register;
determining a difference between said maximum value and said minimum value, and comparing said difference with a predetermined threshold value; and
if said difference is less than said threshold value, and if said maximum value is greater than a current maximum thickness value, taking said maximum value as the new current maximum thickness value.

Thus, by using this threshold value to ignore the deviant values due to jolts or rebounds, it is possible to determine very accurately the thicknesses of the mailpieces while they are moving.

Preferably, said measured values are recorded successively in a register of the First-In-First-Out (FIFO) type having N distinct locations, and each new measurement replaces an existing measurement so that said maximum value and said minimum value of said register are determined for each new measurement on the basis solely of the N previously-recorded measurements in said register.

Advantageously, said number N of locations lies in the range 8 to 32, and each measurement is taken every d millimeters (mm), where d lies in the range 0.5 mm to 2 mm.

Preferably, said threshold value is chosen in a manner such as to define a maximum thickness variation over a determined length of said mailpiece. Said threshold value may be determined using the following formula: DELTA=N×pitch of the encoder×CC, where N is the number of locations in the register, "pitch of the encoder" is the resolution of the measurement device, and CC is a predetermined coefficient of correction.

BRIEF DESCRIPTION OF THE DRAWING

The invention can be understood more clearly on reading the following detailed description accompanied by illustrative and non-limiting examples with reference to the drawings, in which.

DETAILED DESCRIPTION OF IMPLEMENTATIONS

Conventionally, going from upstream to downstream (in the direction in which the mailpieces move through the machine), a mail-handling machine comprises a feed/extract module provided with a mailpiece-receiving deck for receiving a stack of mailpieces that are preferably of various formats (mixed mail), and further provided with a first series of conveyor rollers for driving said mailpieces downstream and against a referencing wall (or "mailpiece guide" wall) firstly to a separation zone having superposed extractor rollers preceded by a guide and in which zone said mailpieces are extracted automatically one-by-one from the stack to a conveyor zone provided with a second series of conveyor rollers formed, for example, of two adjacent front and back sets of superposed rollers for conveying the mailpieces extracted in this way one-by-one downstream from the feed/extract module, e.g. towards a weigh module, or, when no such weigh module is present, directly towards a franking module for franking the mailpieces. As is known, the top rollers of said conveyor rollers are mounted to rotate freely and to move vertically to accommodate the various thicknesses of the mailpieces, and all of the bottom rollers are motor-driven.

Figure 1:
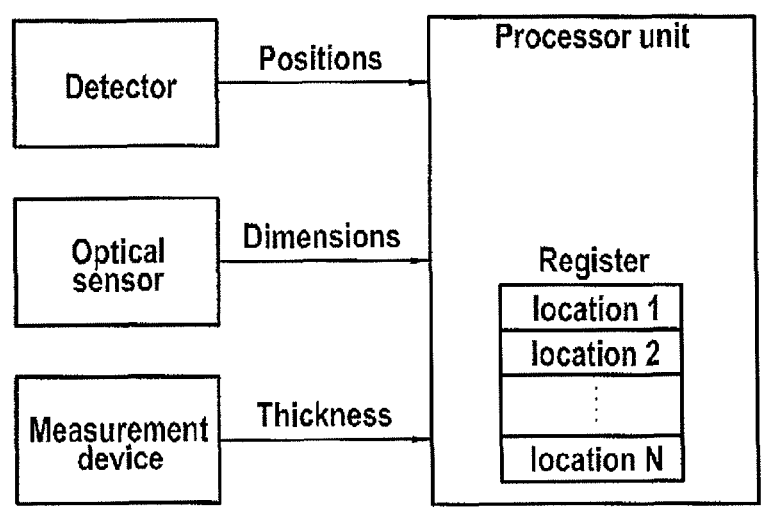
FIG. 1 is a schematical illustration of the mail handling machine of the present invention.

Naturally, as shown in FIG. 1, the mail-handling machine further comprises firstly a processor unit (more particularly having memory and a microprocessor) for managing printing of the mailpieces and conveying of them through the machine, along the conveyor path of the machine, and secondly a detector for detecting the positions of the mailpieces (advantageously for detecting the leading edge of each mailpiece) that is connected to said processor unit and on the basis of which printing of the postal imprint is synchronized (as a function of a predefined standard offset defining a predetermined location for the printing).

In order to measure the lengths and the widths of the mailpieces, the feed/extract module has a set of optical sensors making it possible, in association with the processor unit to acquire the dimensions of each of the mailpieces automatically. For measuring thickness, the module may, e.g. at the outlet of the separation zone, have a mechanical measurement device of the feeler type, or preferably an optical measurement device, like the one described in the application mentioned in the introduction, and that delivers a thickness value at predetermined times (i.e. at a predetermined acquisition/reading or sampling frequency) as the mailpiece advances. For example, it may be chosen to measure said thickness every millimeter, which corresponds to 219 measurements for an envelope of the standard European format 110 mm×220 mm, these measurements being used, for example, in series of N successive measurements recorded in the N locations of a register of the FIFO type, the $N+1^{th}$ measurement pushing out the first measurement, the $N+2^{th}$ measurement pushing out the second measurement, and so on to the $219^{th}$ measurement. This number N may, for example, lie in the range 8 to 32, and the recorded values that depend on the resolution of the measurement device may, for example, be encoded on 8 bits (and thus lie in the range 0 to 225) or be encoded on a higher number of bits.

Figure 2:
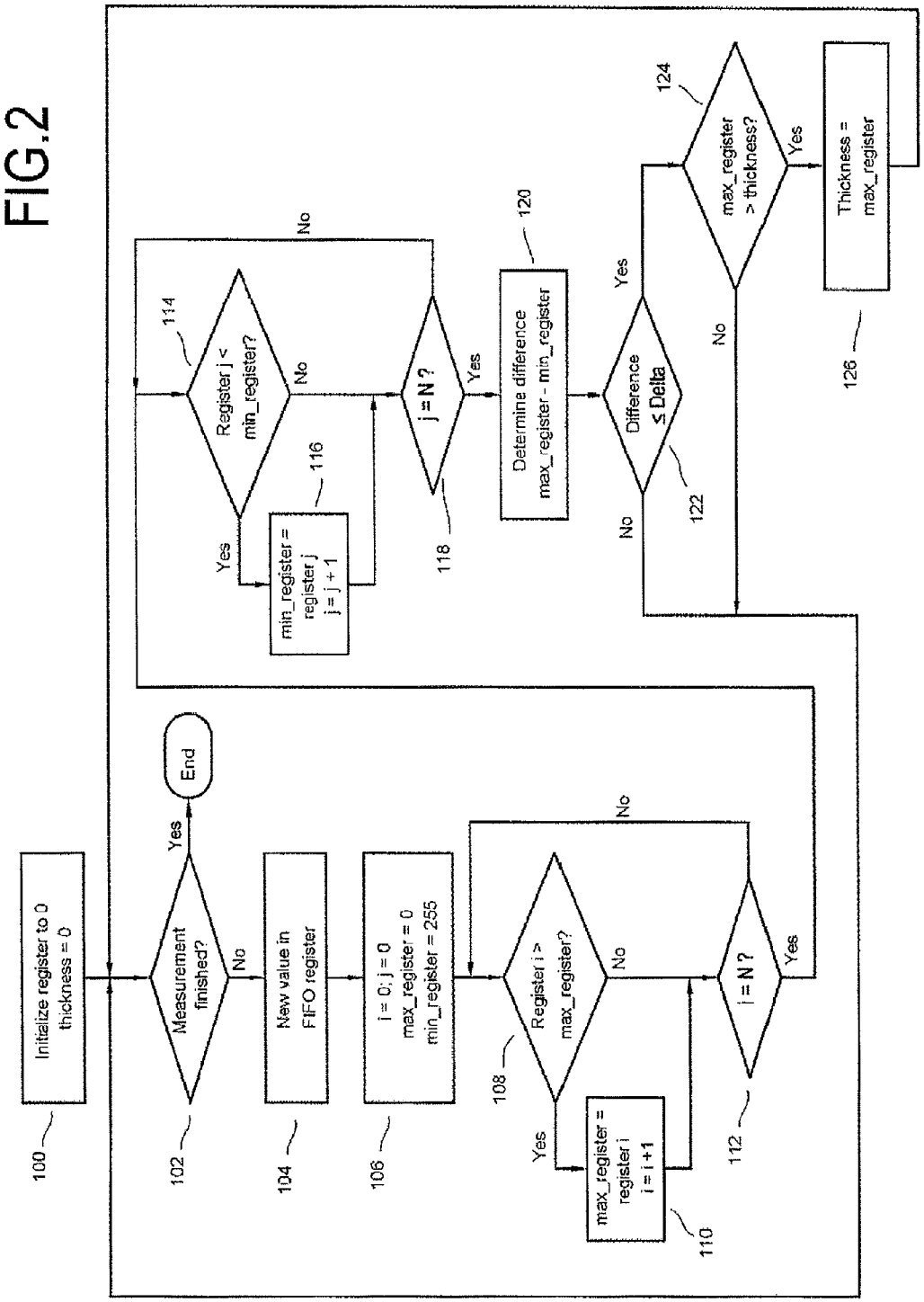
FIG. 2 is an illustration of the various steps in the method of the invention for determining the thickness of a mailpiece.

In the invention, the processor unit to which the various thickness measurements taken by the measurement device are sent is programmed, using the method of processing shown in FIG. 2, to determine accurately the thicknesses of the mailpieces passing through the mail-handling machine.

Thus, after a step 100 of initializing parameters, during which the FIFO register is reset as is the looked-for thickness of the mailpiece, firstly it is checked whether the measurement is finished in a test step 102, and, if the answer to the test is "no", then, in a step 104, a new thickness value delivered by the measurement device is read and is then recorded in the first location of the register. In a following step 106, the maximum value of the register is reset while the minimum value of the register is, for its part, set to be equal, for example, to 255 (this value corresponds to the above-mentioned resolution of an 8-bit converter), and the loop indices i and j are also reset. In another test step 108, the maximum value of the register that is pre-set to zero is compared with the first measured value recorded in the register, and, if the answer to this test is "yes", the recorded maximum value then takes this first measured value in a step 110, and the loop index i is incremented by 1. So long as the index i is not equal to the number N of locations of the register (test of step 112), each of the other measured values is compared with the recorded maximum value, and the recorded maximum value is replaced with the measured value if said measured value is greater than said maximum value. Then, another test is performed in a step 114 for determining, in the same way, whether each of the measured values is less than the previously-recorded minimum value of the register, and, if the answer to this test is "yes", then, in a step 116, the recorded minimum value takes the measured value that is less than it, and the second loop index j is incremented by 1. In the same way as for the preceding loop, so long as the index j is not equal to the number N of locations in the register (test of step 118), each of the other measured values is compared with the recorded minimum value and the recorded minimum value is replaced with the measured value if said measured value is less than said minimum value. Then, in a following step 120, the difference between the recorded maximum and minimum values in the register is determined, and then, in a test step 122, said difference is compared with a predetermined threshold value DELTA. If the answer to the test is "no" the method loops back to step 102 for measuring a new thickness value that is recorded in the register, unless it is the last one. Conversely, if the answer is "yes", another test is performed in a step 124 for determining whether or not the previously-recorded maximum value is greater than the recorded thickness of the mailpiece. If the answer is "no", the method loops back to step 102 as after the preceding test, but, if the answer is "yes", the looked-for thickness of the mailpiece takes, in a step 126, the previously-recorded maximum value and then the method loops back to 102 for launching a new measurement unless it is the last one.

With this method, it is possible to be unaffected by the jolts or rebounds of the measurement device that might give thickness values that are deviant relative to a pre-set margin of error represented by the threshold value DELTA. If the recorded maximum value resulting from a rebound appears greater than the recorded minimum value plus said value DELTA, then, if the answer to the test 116 is "no", said maximum value is not taken into account as the current maximum thickness value for the mailpiece. In addition, calculating the maximum and minimum thickness values on the basis solely of the recorded values (20 in the example mentioned) makes it possible to remove the deviant values from the calculation as the measurements progress, new measurements replacing the old ones, thereby delivering a plurality of series of successive thickness measurements. More precisely, DELTA is chosen as a function of the resolution PE that is chosen for the measurement device (rather than as a function of the encoder that is used) and as a function of the possible thickness variation for the mailpieces over a determined length of the mailpiece. Thus, if it is decided to accept a thickness variation of 4 mm over a length of 10 mm of the mailpiece, and if the thickness measurement is taken every millimeter, a DELTA=4 corresponds to an N=10. More generally, the value of DELTA can be determined by the following formula:

$$DELTA = N \times PE \times CC$$

where CC is a coefficient of correction that is chosen as a function of the desired attenuation, e.g. equal to 0.4. The higher the value of N, the more the peaks of thickness are attenuated, and, conversely, the higher the value of DELTA, the less the peaks of thickness are attenuated. Thus, a value of DELTA lying in the range 3 to 15 is acceptable for a value of N lying in the range 8 to 32.

Thus, the invention makes it possible to obtain very accurate thickness measurement regardless of the defects resulting from the measurement device.

What is claimed is:

1. A method of measuring the maximum thickness of a mailpiece while it is moving through a mail-handling machine, the method comprising:
   acquiring by a measurement device a thickness measurement of the mailpiece;
   recording the measured value in a register of a processor unit;
   determining in said processor unit a maximum value and a minimum value of said register;
   determining in said processor unit a difference between said maximum value and said minimum value, and comparing in said processor unit said difference with a predetermined threshold value; and if said difference is less than said threshold value, and if said maximum value is greater than a current maximum thickness value, taking said maximum value as the new current maximum thickness value in order to compensate for jolts and rebounds of the measuring device.

2. A method according to claim 1, wherein said measured values are recorded successively in said processor unit in a register of the first-in-first out (FIFO) type having N distinct locations, and each new measurement replaces an existing measurement so that said maximum value and said minimum value of said register are determined for each new measurement on the basis solely of the N previously-recorded measurements in said register.

3. A method according to claim 2, wherein said number N of locations lies in the range 8 to 32, and each measurement is taken every d millimeters, where d lies in the range 0.5 mm to 2 mm.

4. A method according to claim 2, wherein said threshold value is chosen in a manner such as to define a maximum thickness variation over a determined length of said mailpiece.

5. A method according to claim 4, wherein said threshold value is determined using the following formula: DELTA=N× PE×CC, where N is the number of locations in the register, PE is the resolution of the measurement device, and CC is a predetermined coefficient of correction.

* * * * *